US011751263B2

(12) United States Patent
Iyer et al.

(10) Patent No.: US 11,751,263 B2
(45) Date of Patent: Sep. 5, 2023

(54) CONNECTION BASED TEAMING WITH COMPOSITE LINKS

(71) Applicant: DELL PRODUCTS, LP, Round Rock, TX (US)

(72) Inventors: Vivek Viswanathan Iyer, Austin, TX (US); Dileep Kumar Soma, Round Rock, TX (US); Minho Cheong, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 229 days.

(21) Appl. No.: 17/208,570

(22) Filed: Mar. 22, 2021

(65) Prior Publication Data
US 2022/0304087 A1    Sep. 22, 2022

(51) Int. Cl.
*H04W 76/15*    (2018.01)
*H04W 24/08*    (2009.01)

(52) U.S. Cl.
CPC ........... *H04W 76/15* (2018.02); *H04W 24/08* (2013.01)

(58) Field of Classification Search
None
See application file for complete search history.

(56) References Cited

U.S. PATENT DOCUMENTS

| 9,715,333 | B2 | 7/2017 | Spetalnick | |
| 2006/0022029 | A1 | 2/2006 | Lin et al. | |
| 2007/0109991 | A1* | 5/2007 | Bennett | H04W 92/02 370/328 |
| 2012/0314663 | A1* | 12/2012 | Dwivedi | H04L 1/1893 370/329 |
| 2014/0274200 | A1* | 9/2014 | Olson | H04B 1/3877 455/552.1 |
| 2014/0330998 | A1* | 11/2014 | Dees | G06F 9/4411 710/303 |
| 2017/0280435 | A1* | 9/2017 | Egner | H04W 52/0261 |
| 2020/0259737 | A1* | 8/2020 | Koshy | H04W 28/0883 |
| 2022/0294715 | A1* | 9/2022 | Agrawal | H04L 41/142 |

* cited by examiner

*Primary Examiner* — The Hy Nguyen
(74) *Attorney, Agent, or Firm* — Larson Newman, LLP

(57) ABSTRACT

An information handling system includes a first wireless data communication interface configured to establish wireless data communication links on a first frequency band, a second wireless data communication interface configured to establish wireless data communication links on a second frequency band, and a processor. The processor establishes a first data communication link on the first wireless data communication interface with an access point external to the information handling system, determines a first link characteristic for the first data communication link, establishes a second data communication link on the second wireless data communication interface with the access point, determines a second link characteristic for the second data communication link, selects one of the first and second data communication links based on the first and second link characteristics, and maintains the selected one of the first or second data communication links based upon the selection. The first and second link characteristics are of a common type of characteristic.

18 Claims, 6 Drawing Sheets

CONNECTION BASED TEAMING WITH COMPOSITE LINKS

FIELD OF THE DISCLOSURE

This disclosure generally relates to information handling systems, and more particularly relates to connection based teaming (CBT) with composite links of information handling systems.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a first wireless data communication interface configured to establish wireless data communication links on a first frequency band, and a second wireless data communication interface configured to establish wireless data communication links on a second frequency band. A processor may establish a first data communication link on the first wireless data communication interface with an access point external to the information handling system, determine a first link characteristic for the first data communication link, establish a second data communication link on the second wireless data communication interface with the access point, determine a second link characteristic for the second data communication link, select one of the first and second data communication links based on the first and second link characteristics, and maintain the selected one of the first or second data communication links based upon the selection. The first and second link characteristics may be of a common type of characteristic.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
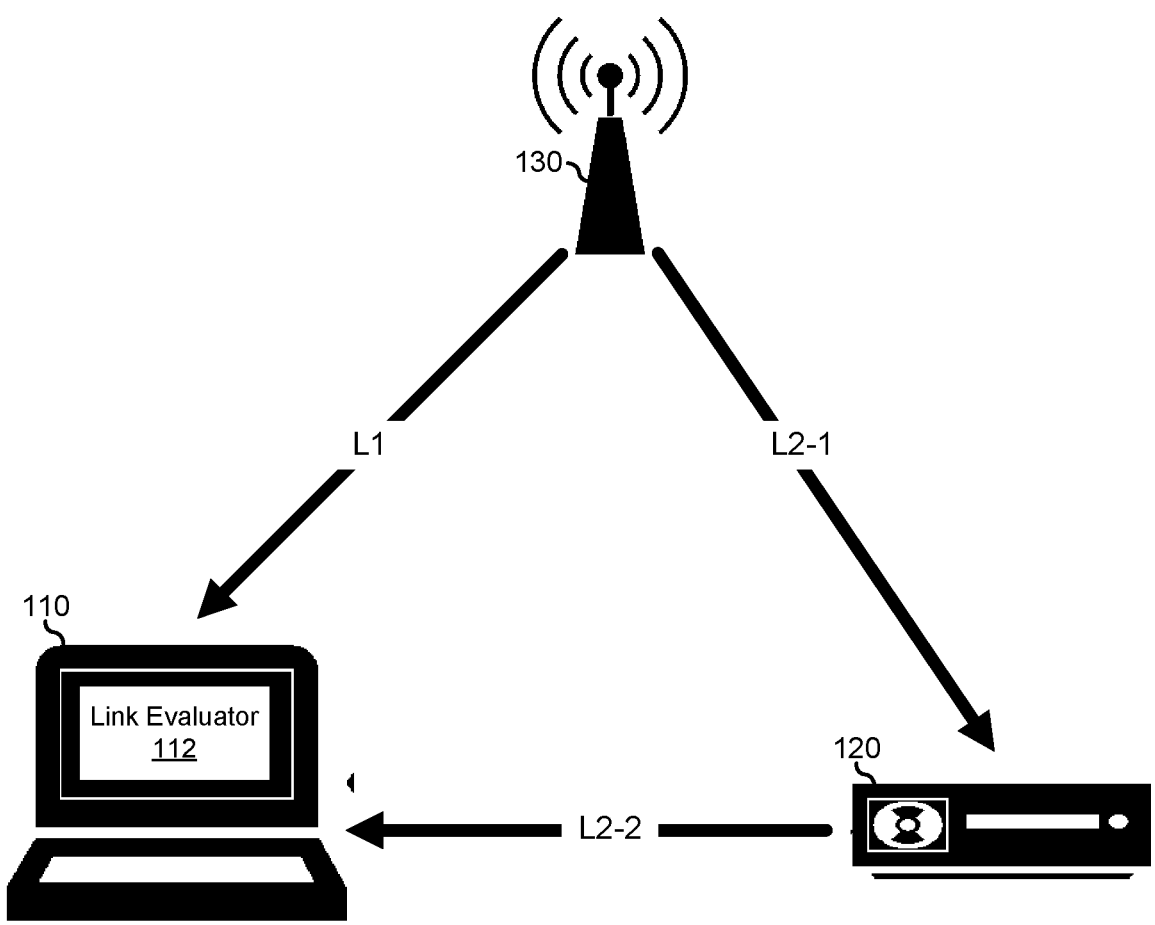
FIGS. 1-5 illustrate connected environments according to various embodiments of the current disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-5 illustrate connected environments which include an information handling system 110 with various combinations of other information handling systems 140, 142, and 144 docking stations 120 and 122, an access point 130, and monitors 140 and 142. The connected environments represents a computing environment that is characterized by highly flexible connectivity between the elements of the connected environment via broad usage of wireless interconnectivity for discovery, authentication, control, data transfer, and the like, with an emphasis on flexible compute capabilities among the information handling systems, the docking stations, the access point, and the monitors. Interconnectivity between the elements of the connected environments may include mesh networks with other elements, not shown, such as storage arrays, other information handling systems, gaming servers, and the like.

Typical wireless connectivity includes a single data communication radio that operates in one of two different frequency bands, such as 2.4 GHz and 5.0 GHz bands. That is, the data communication radio determines to operate over one frequency band or the other. For example, a laptop computer may connect to an access point via the 2.4 GHz band, either because the laptop computer and the access point are remotely situated or because one or more of the devices only supports the 2.4 GHz band. In another example, the laptop computer can connect to the access point via the 5.0 GHz band, either because the laptop computer and the access point are more closely situated or because both of the devices support the 5.0 GHz band. Here, it will be understood that the data bandwidth for the 5.0 GHz band is generally higher than the bandwidth for the 2.4 GHz band and that the range of the 5.0 GHz band is generally lower than the range of the 2.4 GHz band.

In the various embodiments, one or more of the elements of the connected environments utilize a concurrent dual band (CDB) data communication radio functionality. Here, a device with a CDB functionality can form wireless connections via both frequency bands of a data communication radio. In a first case, while each frequency band may be connected to a different device, the bandwidth of the data communication radio will be shared between the frequency bands, for example via time-sharing in the L2 or L3 layer. In a second case, each frequency band may be utilized for its full bandwidth communications. Here, each frequency band may be understood as a separate data communication radio. In another embodiment, one or more of the elements of the connected environments may include multiple dual-band data communication radios. For example, a docking station may include two CDB data communication radios, the first for connecting to an information handling system, and the second for connecting to an access point or the like. Hereinafter, a CDB data communication radio will be referred to as a CDB radio.

The information handling systems each represent a computer system such as a laptop computer, a workstation, a connected device like a smart cellular telephone or tablet device, or the like. The docking stations each represent devices that operate to expand the functionality of the associated information handling systems. For example, where an information handling system represents a laptop computer, the associated docking station may provide a power adapter that powers the laptop computer, expanded human interface devices, such as an ergonomic keyboard or mouse, large capacity data storage, larger and/or multiple display devices or monitors, and the like. The access points each represent data communication nodes that can be connected to the other elements of the associated connected environments, and that provide connectivity to a wider data network, such as the Internet, a corporate internet, a local area network (LAN), a wide area network (WAN), or the like.

As such, the access points may be understood to provide connectivity to a corporate data network, a remote desktop environment, a cloud computing environment, a data or streaming service, or the like. It will be understood that, while the data communication link between the information handling systems and the docking stations are illustrated as being wireless data communication links, there may be other data communication links, such as wired links, between the information handling systems and the docking stations, or between other elements of the associated connected environments, as needed or desired. Moreover, as described herein, the wireless data communication links may be understood to include wireless data communication links as defined by a Bluetooth standard, an IEEE 802.11 standard, a cellular data standards, a Near Field Communication (NFC) standard, an infrared standard, or another wireless data communication standard, as needed or desire.

The inventors of the current disclosure have understood that the usage models possible with a connected environment may lead to enhanced user experiences or may equally lead to degraded user experiences, based upon how the various wireless data communication links are established and maintained. For example, a laptop equipped with CDB functionality may utilize one radio frequency band for establishing a first wireless data communication link with an access point that has Internet access, and may utilize the other radio frequency band for establishing a second wireless data communication link with a docking station that is connected to a monitor.

In a first scenario, where the laptop is more proximate to the docking station than to the access point, utilizing the 2.4 GHz band to establish the first wireless data communication link may lead to a better connection to the access point than would be the case if the 5.0 GHz band were utilized to establish the first wireless data communication link with the access point. In contrast, in a second scenario, where the laptop is more proximate to the access point, utilizing the 5.0 GHz band to establish the first wireless data communication link may lead to faster connection to the access point than would be the case if the 2.4 GHz band were utilized to establish the first wireless data communication link with the access point. Thus, it can be seen that various static rules for establishing the wireless data communication links may not lead to optimal performance within connected environment 100.

FIG. 1 illustrates a connected environment 100 as including information handling system 110, docking station 120, and access point 130. Information handling system 110 includes a link evaluator module 112. Link evaluator module 112 operates to dynamically optimize the data connection links that are established by information handling system 110, and particularly to understand and manage composite data communication links. A composite data communication link may include a non-single-hop data communication link between information handling system 110 and access point 130, and may include wireless data communication links and wired data communication links, as needed or desired. Further, a composite data communication link may include other non-single-hop data communication links to other devices within a connected environment. For example, information handling system 110 is configured in FIG. 1 with a first wireless data communication link (L1) to access point 130, and with a composite data communication link (L2) that includes a second wireless data communication link between the information handling system and docking station 120 and a data communication link (wired or wireless) between the docking station and access point 130.

In optimizing the data communication links, link evaluator module 112 utilizes various link metrics, such as link bandwidth, link latency, or the like. Link evaluator module 112 further utilizes various metrics associated with information handling system 110 such as the running applications on the information handling system, the operating mode of the information handling system, and the like. In particular, link evaluator module 112 applies an algorithmic evaluation of the various data communication links, including each hop in a composite data communication link to determine a best configuration for the current operating environment of information handling system 110.

In a particular embodiment, the algorithm employed by link evaluator module 112 includes a data communication link discovery and real-time monitoring phase, a data communication link evaluation phase, a data communication link ranking phase, and a data communication link implementation phase. In the data communication link discovery and real-time monitoring phase, link evaluator module 112 operates to identify the possible link configurations between the various elements of connected environment 100. For example, during data communication link discovery, link evaluation module 112 may direct information handling system 110 to perform a discovery phase where the information handling system establishes wireless data communication links with access point 130 first utilizing the 2.4 GHz band, and then utilizing the 5.0 GHz band, and then, for each wireless data communication link, the link evaluation module may gather the associated link metrics.

Link evaluation module 112 may then perform a similar evaluation of 2.4 GHZ and 5.0 GHz band wireless data communication links with docking station 120, and gather the associated link metrics. Finally, link evaluator module 112 may retrieve link metrics for the data communication link between docking station 120 and access point 130. In a particular embodiment, the data communication link discovery is performed on a periodic basis, such as once an hour, or another time period, as needed or desired. In another embodiment, the data communication link discover is performed when there is a change in the operational status of information handling system 110, such as when a particular application is launched or halted, when an operating mode, such as a processor power state or a system sleep state, has changed, or the like.

In the data communication link evaluation phase, link evaluator module 112 provides composite link metrics for the composite data communication links. For example, given the latencies of each of the potential data communication links as determined in the data communication link evaluation phase, link evaluator module 112 may provide an estimated latency for each composite data communication link that is equal to the sum of the individual latencies. Further, given the bandwidth limits for each of the potential data communication links, link evaluator module 112 may provide an estimated maximum bandwidth for each composite data communication link that is equal to the lowest of the individual bandwidths.

In the data communication link ranking phase, each of the potential data communication links, including the single-hop links and the composite links, are ranked in terms of their associated latencies and maximum bandwidths. In the data communication link implementation phase, the running applications and the operating environment of information handling system 110 are determined. Here, each application is ascribed a score for its sensitivity to latency and to bandwidth constraints. For example, each application may be ascribed a rating of zero (0) or one (1) as being either more or less sensitive to either latency or bandwidth, or each application may be ascribe a sliding scale rating for latency and bandwidth. In the latter case, an average can be determined of the scale values for each of the running applications to come up with a current value for latency and for bandwidth sensitivity. In a particular case, the various applications may be prioritized and their individual scale values can be weighted in accordance with their priority. Then, link evaluator module 112 operates to select a combination of the potential data communication links that best accommodate the application mix in the operating environment, and directs information handling system 110 to establish the selected combination of data communication links.

If a pair of implemented data communication links each have substantially equal latencies or maximum bandwidths, then link evaluator module 112 operates to provide a weighted allocation of applications between the implemented data communication links, such that the data communication traffic for each application will be assigned to a particular data communication link so as to balance the data communication traffic load between the implemented data communication links. On the other hand, if the pair of data communication links have substantially different latencies or maximum bandwidths, then link evaluator module 112 operates to provide a water filling allocation of applications, where the lower latency data communication link is preferably allocated to handle the data communication traffic from latency sensitive applications, and the higher bandwidth data communication link is preferably allocated to handle the data communication traffic from bandwidth sensitive applications.

In a particular embodiment, link evaluator module 112 represents a kernel mode driver that interacts with an operating system instantiated on information handling system 110, that determines the operating state of the information handling system and receives information related to the applications running on the information handling system in order to evaluate and configure the data communication links. In another embodiment, link evaluator module 112 represents a service instantiated in the operating system.

Connected environment 100 illustrates a particular use case where information handling system 110 is connected to access point 130 via two links, a wireless data communication link (L1) directly to the access point, and a composite data communication link (L2) consisting of a wireless data communication link (L2-2) to docking station 120 and a wired or wireless data communication link (L2-1) between the docking station and the access point. Here, link evaluator module 112 operates to determine whether links L1 and L2 are substantially equal, and thus to utilize the weighted allocation of applications between the links, or whether the links are unequal, and thus to use the water filling allocation of applications, preferring to allocate applications to the better of the links first.

Figure 2:
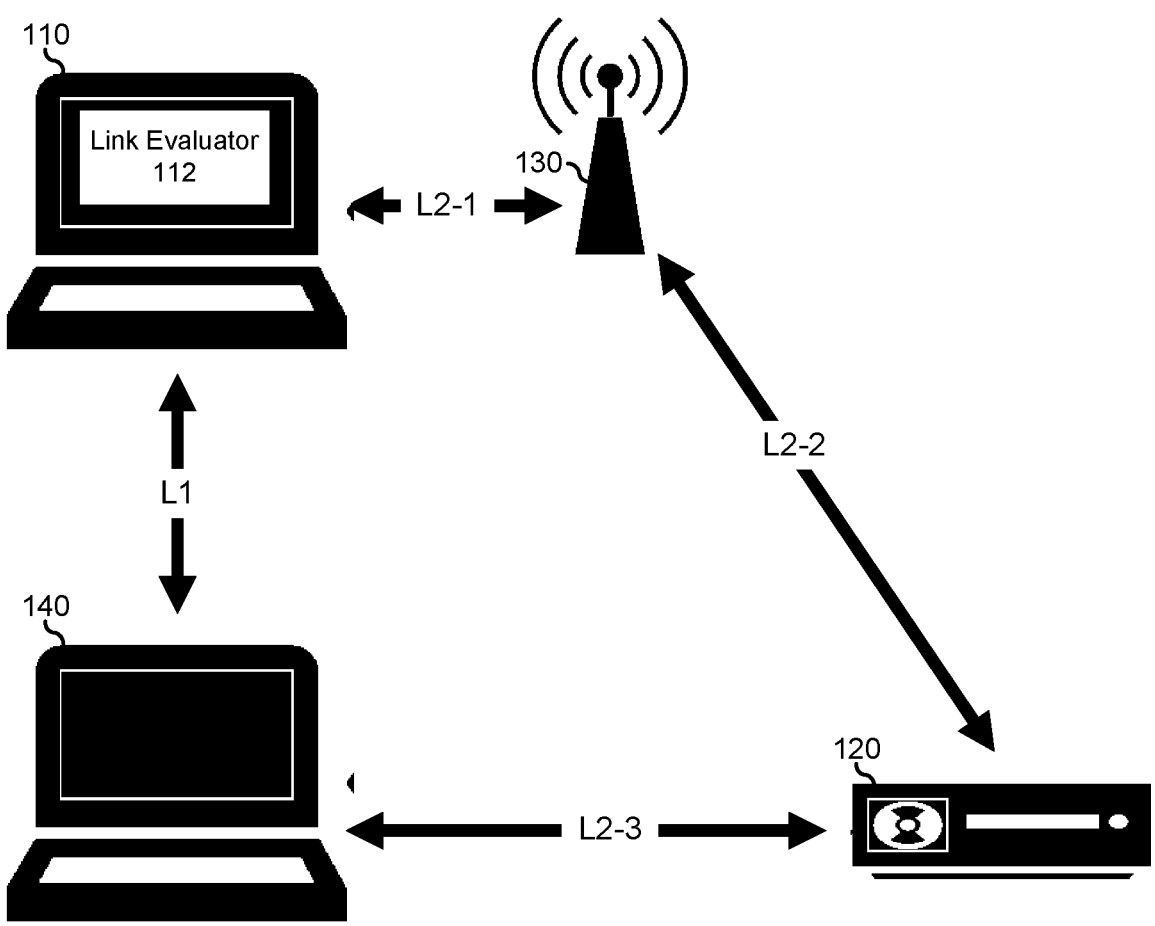

FIG. 2 illustrates a connected environment 200 including information handling system 110, docking station 120, access point 130, and information handling system 140. Connected environment 200 illustrates a use case where, for example, users of information handling systems 110 and 140 desire to collaborate, but where information handling system 140 is not CDB capable. Information handling system 110 is connected to information handling system 140 via a wireless data communication link (L1), and also via a composite data communication link (L2) that includes a wireless data communication link (L2-1) to access point 130, a wired or wireless data communication link (L2-2) to docking station 120, and a wired or wireless data communication link (L2-3) to information handling system 140. Here, for example, information handling system 110 may have an inferior WiFi radio device, such that link L1 is bandwidth limited as compared with link L2, and the link evaluator 112 may determine that sharing information with information handling system 140 via link L2 is advantageous over the seemingly more proximate link L1.

Figure 3:
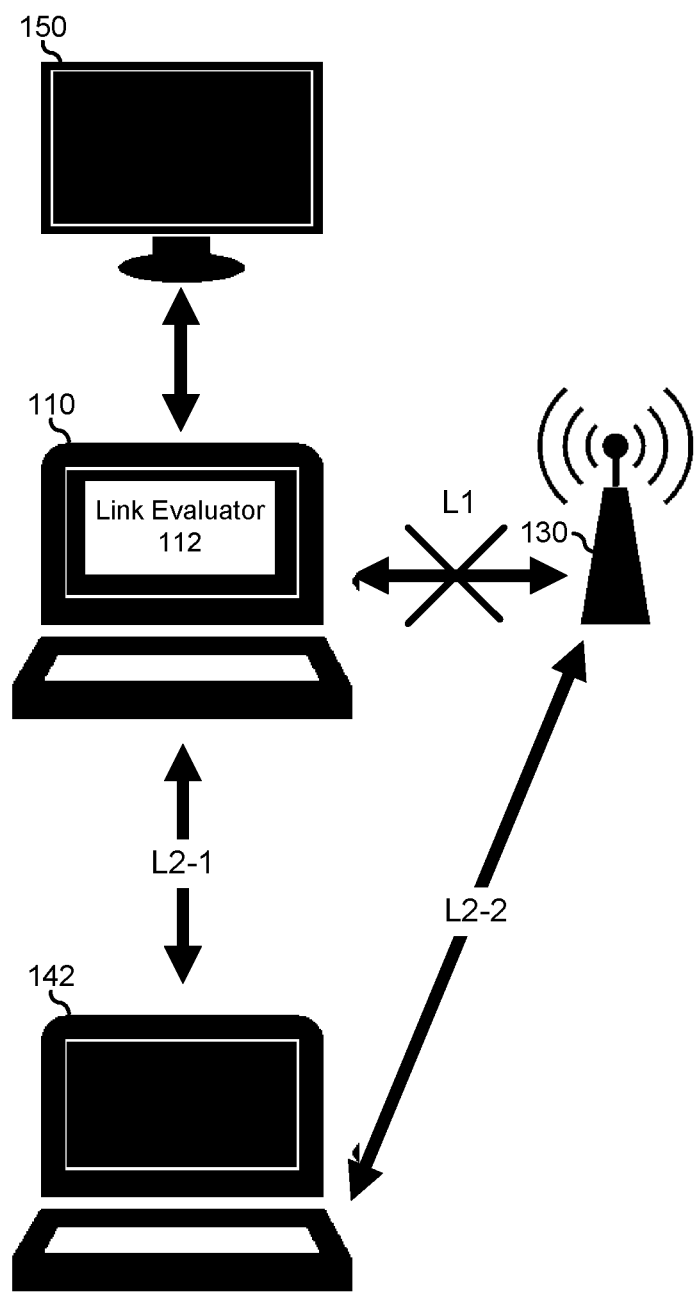

FIG. 3 illustrates a connected environment 300 including information handling system 110, access point 130, an information handling system 142, and a monitor 150. Connected environment 300 illustrates a use case where, for example, a user of information handling system 110 needs to present a document on display 150, but where link evaluator module 112 determines that information handling system 142 has a better connection with access point 130 via link L2 than does information handling system 110 via link L1. Here, link evaluator module 112 may thus determine to receive the presentation from access point 130 via link L2, rather than via link L1.

Figure 4:
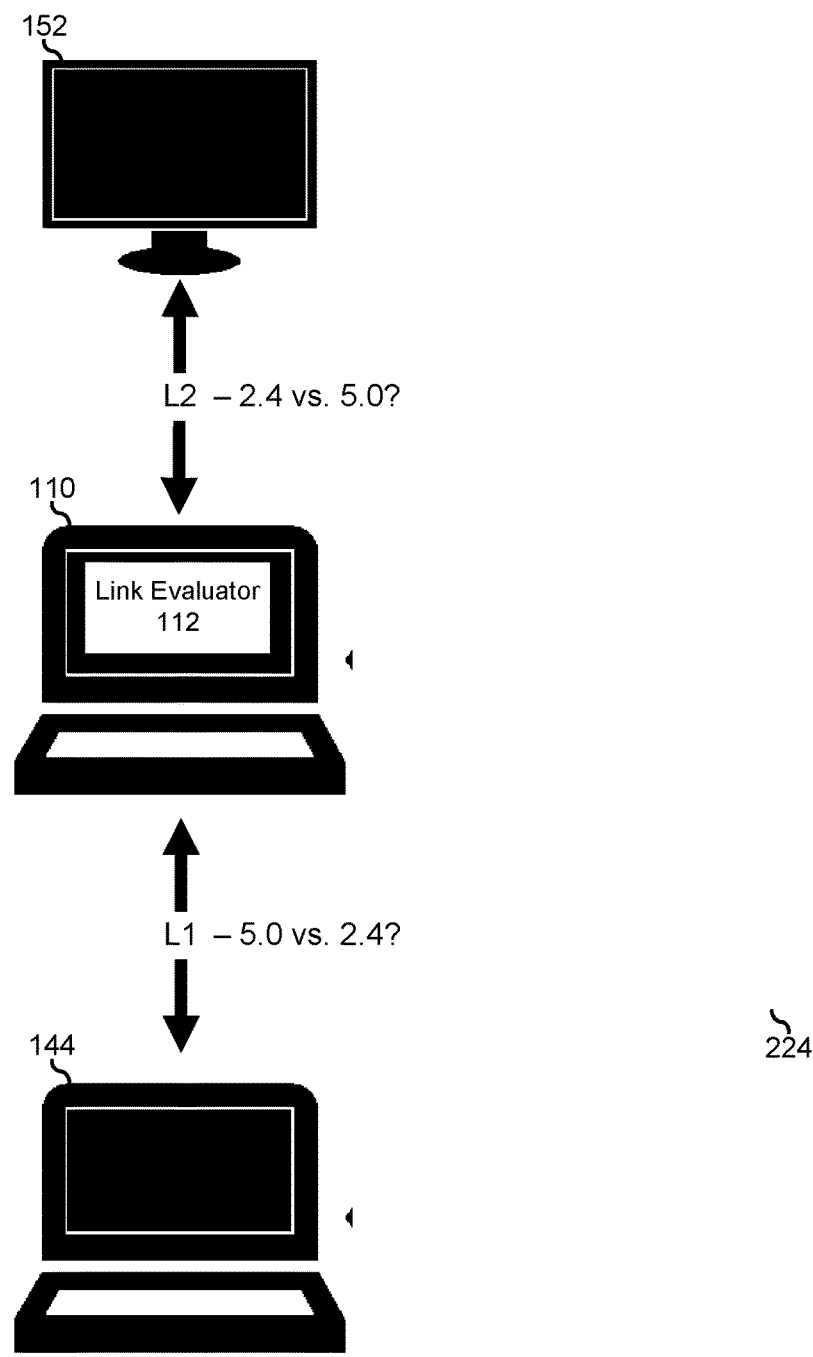

FIG. 4 illustrates a connected environment 400 including information handling system 110, an information handling system 144, and monitor 150. Connected environment 400 illustrates a use case where, for example, a user of information handling system 110 is presenting a presentation on monitor 150, and, during the presentation, develops a need to share a document with information handling system 144. Here, link evaluator module 112 operates to determine the bandwidths and latencies of the link L1 to information handling system 144 and of the link L2 to monitor 150, and determines whether to establish link L1 via the 2.4 GHz band or the 5.0 GHz band, and to maintain link L2 or to change frequency bands of the link.

Figure 5:
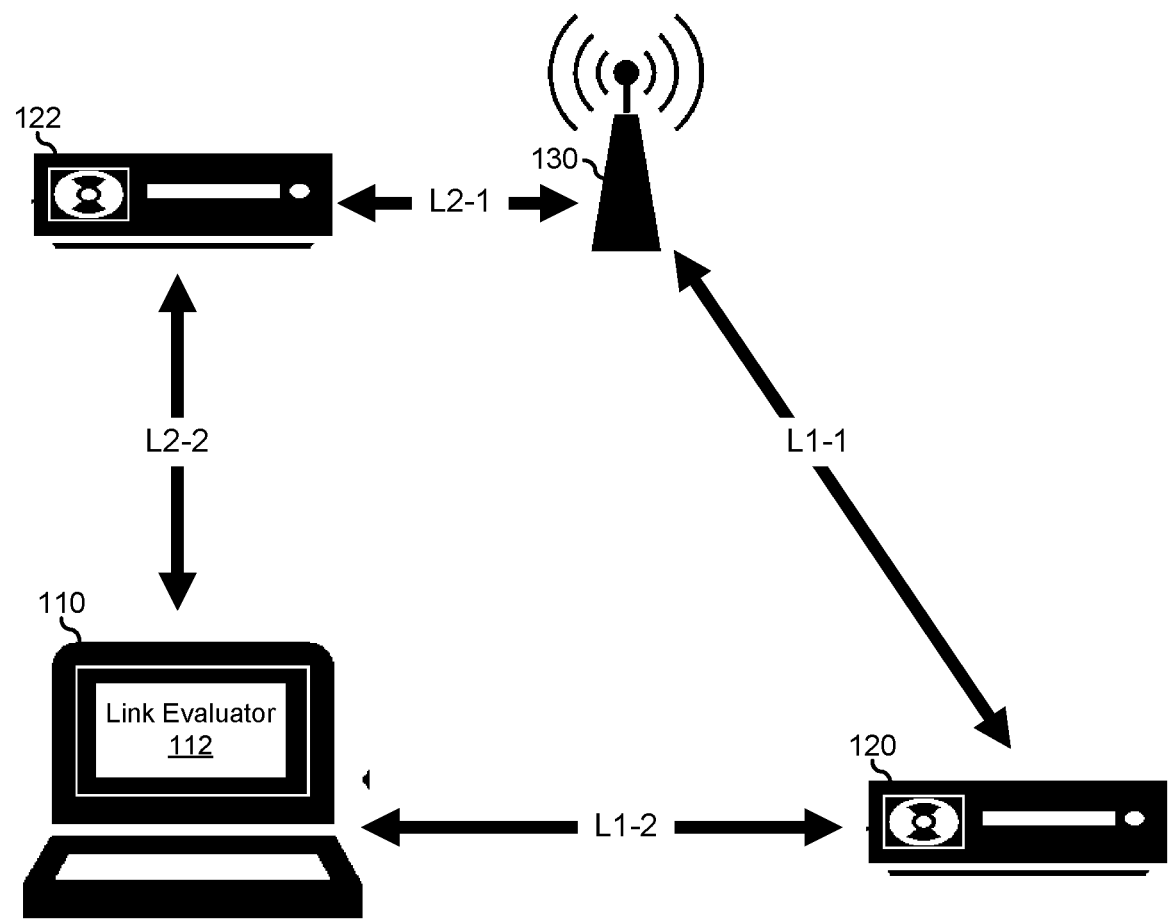

FIG. 5 illustrates a connected environment 500 including information handling system 110, docking stations 120 and 122, and access point 130. Connected environment 500 illustrates a use case where information handling system 110 has the option to connect to access point 130 via link L1 through access point 120, or via link L2 through access point 122. Here, link evaluator module 112 can determine a better link for the type of activity and the operating environment of information handling system 100. In a particular case, where one of the links L1 and L2 has a lower latency, and the other link has a higher bandwidth, link evaluator module 112 operates to direct data traffic associated with latency sensitive application to access point 130 via the low latency link and to direct data traffic associated with bandwidth sensitive applications to the access point via the high bandwidth link.

Figure 6:
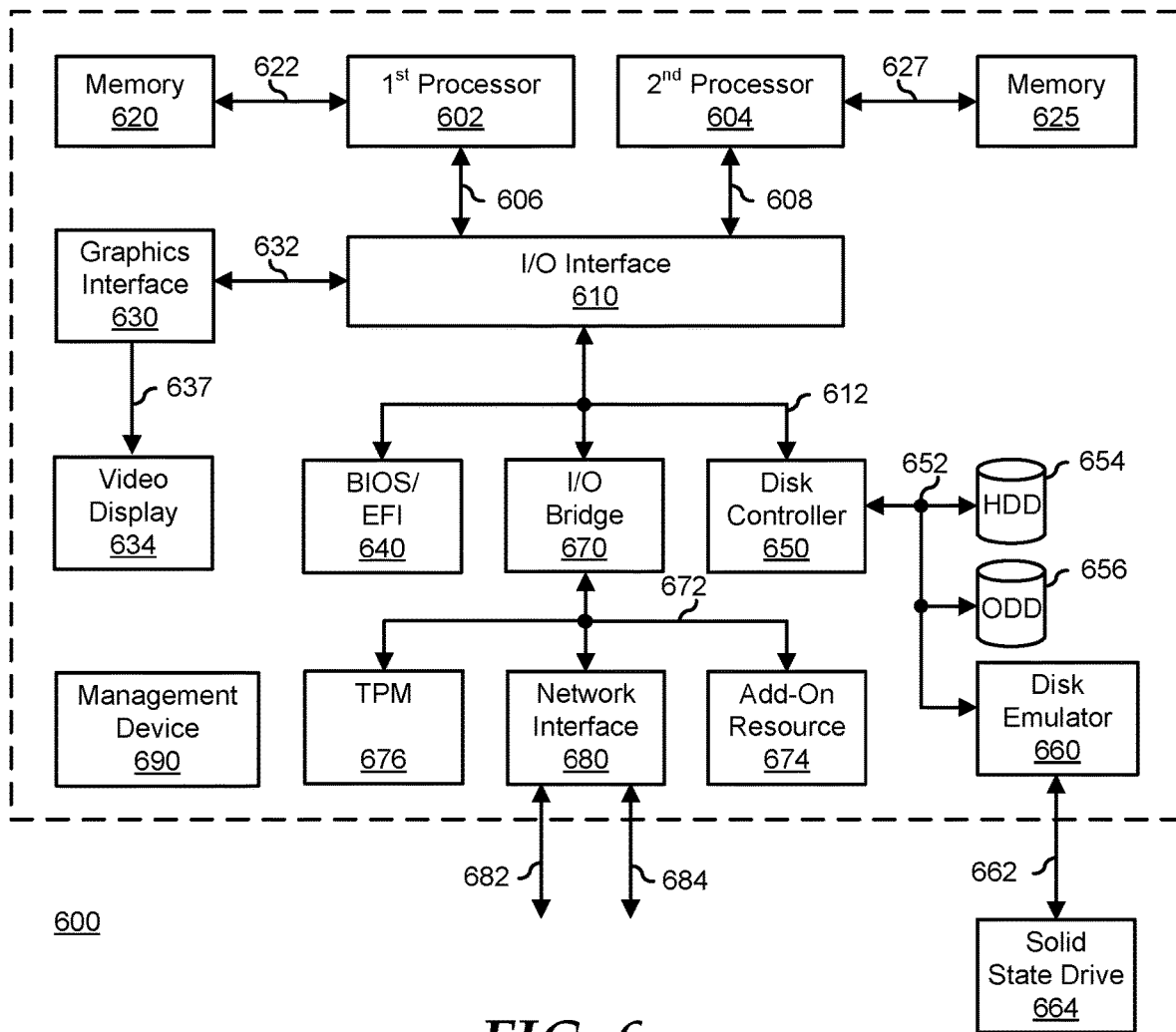
FIG. 6 is a block diagram illustrating a generalized information handling system according to another embodiment of the current disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a first wireless data communication interface configured to establish wireless data communication links on a first frequency band;
a second wireless data communication interface configured to establish wireless data communication links on a second frequency band; and
a processor configured to:
establish a first wireless data communication link on the first wireless data communication interface with an access point external to the information handling system;
determine a first link characteristic for the first wireless data communication link;
establish a second wireless data communication link on the second wireless data communication interface with the access point;
determine a second link characteristic for the second wireless data communication link, wherein the first and second link characteristics are of a common type of characteristic;
select one of the first and second wireless data communication links based on the first and second link characteristics;
maintain the selected one of the first or second wireless data communication links based upon the selection;
establish a third wireless data communication link on the first wireless data communication interface with a docking station external to the information handling system, wherein the docking station is coupled to the access point via another data communication link;
determine a third link characteristic for the third wireless data communication link, and a fourth link characteristic for the other data communication link, wherein the third and fourth link characteristics are of the common type of link characteristic;
establish a fourth wireless data communication link on the second wireless data communication interface with the docking station;
determine a fifth link characteristic for the fourth wireless data communication link;
select one of the third and fourth wireless data communication links based on the third, fourth, and fifth link characteristics; and
maintain the selected one of the third or fourth wireless data communication links based upon the selection.

2. The information handling system of claim 1, wherein the common type includes a latency.

3. The information handling system of claim 2, wherein selecting the one of the third and fourth wireless data communication links is further based upon a sum of the third and fourth link characteristics and a sum of the fourth and fifth link characteristics.

4. The information handling system of claim 1, wherein the common type includes a bandwidth.

5. The information handling system of claim 4, wherein selecting the one of the third and fourth wireless data communication links is further based upon a lower of the third and fourth link characteristics, and a lower of the fourth and fifth link characteristics.

6. The information handling system of claim 1, wherein the maintaining of the selected one of the first or second wireless data communication links is further based upon an operating state of the information handling system.

7. The information handling system of claim 6, wherein the operating state of the information handling system includes an application instantiated on the information handling system.

8. The information handling system of claim 6, wherein the operating state of the information handling system includes at least one of an Advanced Configuration and Power Interface machine state, and a processor state.

9. A method, comprising:
establishing, by a processor of an information handling system, a first wireless data communication link on a first wireless data communication interface of the information handling system, wherein the first wireless data communication link is established with an access point external to the information handling system, and wherein the first wireless data communication interface is configured to establish wireless data communication links on a first frequency band;
determining a first link characteristic for the first wireless data communication link;
establishing, by the processor, a second wireless data communication link on a second wireless data communication interface of the information handling system, wherein the second wireless data communication link is established with the access point, and wherein the second wireless data communication interface is configured to establish wireless data communication links on a second frequency band;
determining a second link characteristic for the second wireless data communication link,
wherein the first and second link characteristics are of a common type of characteristic;
selecting one of the first and second wireless data communication links based on the first and second link characteristics;
maintaining the selected one of the first or second wireless data communication links based upon the selection;
establishing a third wireless data communication link on the first wireless data communication interface with a docking station external to the information handling system, wherein the docking station is coupled to the access point via another data communication link;
determining a third link characteristic for the third wireless data communication link, and
a fourth link characteristic for the other data communication link, wherein the third and fourth link characteristics are of the common type of link characterstic;
establishing a fourth wireless data communication link on the second wireless data communication interface with the docking station;
determining a fifth link characteristic for the fourth wireless data communication link;
selecting one of the third and fourth wireless data communication links based on the third, fourth, and fifth link characteristics; and
maintaining the selected one of the third or fourth wireless data communication links based upon the selection.

10. The method of claim 9, wherein the common type includes a latency.

11. The method of claim 10, wherein selecting the one of the third and fourth wireless data communication links is further based upon a sum of the third and fourth link characteristics and a sum of the fourth and fifth link characteristics.

12. The method of claim 9, wherein the common type includes a bandwidth.

13. The method of claim 12, wherein selecting the one of the third and fourth wireless data communication links is further based upon a lower of the third and fourth link characteristics, and a lower of the fourth and fifth link characteristics.

14. The method of claim 9, wherein the maintaining of the selected one of the first or second wireless data communication links is further based upon an operating state of the information handling system.

15. The method of claim 14, wherein the operating state of the information handling system includes an application instantiated on the information handling system.

16. The method of claim 14, wherein the operating state of the information handling system includes at least one of an Advanced Configuration and Power Interface machine state, and a processor state.

17. An information handling system, comprising:
a first wireless data communication interface configured to establish wireless data communication links on a first frequency band;
a second wireless data communication interface configured to establish wireless data communication links on a second frequency band; and
a processor configured to:
establish a first wireless data communication link on the first wireless data communication interface with a first device external to the information handling system;
determine a first link characteristic for the first wireless data communication link;
establish a second wireless data communication link on the second wireless data communication interface with the first device;
determine a second link characteristic for the second wireless data communication link;
establish a third wireless data communication link on the first wireless data communication interface with a second device external to the information handling system;
determine a third link characteristic for the third wireless data communication link;
establish a fourth wireless data communication link on the second wireless data communication interface with the second device;
determine a fourth link characteristic for the fourth wireless data communication link, wherein the first, second, third, and fourth link characteristics are of a common type of characteristic;
select one of the first and second wireless data communication links to maintain with the first device based on the first, second, third, and fourth link characteristics;
maintain the selected one of the first or second wireless data communication links based upon the selection;
when the first wireless data communication link is selected, maintain the fourth wireless data communication link; and when the second wireless data communication link is selected, maintain the third wireless data communication link.

18. The information handling system of claim 17, wherein the first frequency band includes a 2.4 GHz frequency band and the second frequency band includes a 5.0 GHz frequency band.

* * * * *